Patented July 28, 1942

2,291,585

UNITED STATES PATENT OFFICE 2,291,585

PROCESS FOR PRODUCING PHENOL FROM CYCLOHEXANOL AND CYCLOHEXANONE

Edward P. Bartlett and Edmund Field, Wilmington, Del., assignors to E. I. du Pont de Nemours & Company, Wilmington, Del., a corporation of Delaware No Drawing. Application December 27, 1939, Serial No. 311,120

14 Claims. (Cl. 260—621)

This invention relates to catalytic dehydrogenation processes and more particularly to catalytic dehydrogenation of cyclohexanol and cyclohexanone to phenol.

It has been intimated in the prior art that cyclohexanol may be dehydrogenated to phenol. Thus Sabatier and Senderens (Comptes rendu 137, 1026 (1903)) showed passage of a mixture of cyclohexanol and cyclohexanone over reduced copper at 300° (in the absence of hydrogen) and stated that phenol was produced during the process but decomposed to give traces of higher pyrogenous products. Skita and Ritter (Berichte 44, 668 (1911)) state that when cyclohexanone is hydrogenated over nickel at 230° C. 25% of phenol is collected along with the cyclohexanol. In Reid's translation of Sabatier: Catalysis in Organic Chemistry (second printing) page 229, paragraph 642, it is stated that cyclohexanol is largely converted into phenol when passed together with hydrogen over nickel at 360°. This reference is credited to Padoa and Fabris, Lincei 17 (1), 111 and 125 (1908). Examination of this reference does not disclose the information credited by Sabatier to Padoa and Fabris. In any event, according to our experiments practical yields of phenol are not possible by following any of these disclosures. For instance, when an attempt was made to dehydrogenate cyclohexanol to phenol over a reduced copper oxide catalyst at 350°, 4.3% of the alcohol was converted to phenol and 9% was dehydrated while conversion to cyclohexanone was 75%. We obtained somewhat similar results when the catalyst was reduced nickel oxide. In one case with only 8.5% conversion to phenol dehydration was 6.3% and when the temperature was raised to 400° only 3.1% was recovered as phenol while 13.8% was dehydrated. Furthermore, these catalysts lost their activity rapidly in the course of a few hours.

Our study of the conversion of cyclohexanol and cyclohexanone to phenol has disclosed the importance of operating under conditions that produce high conversions. Otherwise one encounters a very difficult problem of recovering the phenol which is produced. This problem arises from the fact that phenol forms high boiling binary mixtures both with cyclohexanol and with cyclohexanone. These binaries are difficult to separate from one another and furthermore the unreacted cyclohexanol and cyclohexanone are difficult to separate from these binaries. Inasmuch as the phenol-cyclohexanone binary contains 29% cyclohexanone and 71% phenol by weight, and inasmuch as the phenol-cyclohexanol binary at 760 mm. contains 12% cyclohexanol and 88% phenol (the phenol content of this binary drops as pressure is decreased) a relatively small amount of cyclohexanone or cyclohexanol unreacted will absorb, or segregate in the form of a binary, a large quantity of phenol. Accordingly with low conversions of the order of 50% at the maximum it is not feasible to separate the phenol from the unreacted products by the usual distillation technique. That is to say, the conversion to phenol should be greater than 71% before a greater quantity of phenol will be formed than is required for satisfaction of its binary mixture composition with cyclohexanone. A similar situation rises with respect to the cyclohexanol binary. Ordinarily, however, the cyclohexanol is present in only small quantities and the recovery problem is almost exclusively that for recovery of the ketone and phenol.

A study of the equilibrium involved in the conversion of cyclohexanol and cyclohexanone to phenol has shown that relatively high temperatures as, for example, temperatures above 350° are required if substantially high conversions are to be obtained. Our studies show, however, that under such high temperature conditions catalysts that have heretofore been disclosed not only lose their activity rapidly but promote excessive dehydration with consequent loss of yield.

It is an object of this invention to overcome the disadvantages of the prior art and to provide a new and improved process for the production of phenol by catalytic dehydrogenation.

It is a further object to provide an improved process for the catalytic dehydrogenation of cyclohexanol or cyclohexanone or their mixtures to phenol. Other objects and advantages of this invention will be apparent from the following specification.

According to this invention cyclohexanol or cyclohexanone or both may be dehydrogenated to phenol with conversions approaching those of equilibrium by passing these substances in vapor state over an improved dehydrogenation catalyst at an elevated temperature. The resulting conversion or fraction of ketone or alcohol converted to phenol may be from 80–100%.

Our investigations show that excellent results may be obtained by passing cyclohexanol and/or cyclohexanone over a catalyst comprising manganese and chromium, in the form, for example, of manganese chromite, either unpromoted or promoted with other constituents. Although manganese and chromium may be used advantageously in the form of fused mixtures of their metals or in some form of oxidation, it is preferred to utilize them in the form of what is commonly referred to in the art as "manganese chromite," i. e., a mixture of manganese and chromium obtained as described in Zeitschrift fur anorg. Chemie, volume 44, page 453 (1906) and volume 76, page 30, (1912), or as prepared according to the general disclosure of Lazier, U. S. 1,829,046.

We have found further that catalysts of this type are definitely improved by the addition of small amounts of alkaline earth and alkali metal compounds as, for example, potassium carbonate. Three to five per cent by weight of the alkaline earth or alkali metal compound is sufficient to produce a real improvement in the catalytic action. Where, hereinafter as well as in the claims, we refer to "alkali" it is meant to include alkaline earth metals and alkali metals as such or in the form of their compounds such as oxides, salts and the like. We have also observed that catalysts such as copper and nickel, which we have already stated tend to favor undesired side reactions, are substantially improved by the addition of alkali. Our results also show that copper may be advantageously added to manganese chromite without producing any excessive dehydration. To such a copper-manganese-chromium catalyst the addition of an alkali has also been found advantageous.

By means of such catalysts as herein described, the conversion of cyclohexanol and/or cyclohexanone to phenol may be so high that the amount of phenol produced over that which ordinarily forms binary mixtures with cyclohexanone and cyclohexanol is readily separated and removed from the reaction product by simple distillation. The unreacted cyclohexanone or cyclohexanol or both may be returned for further dehydrogenation along with the phenol associated therewith in the form of binary mixtures. It should be understood, however, that the use of these catalysts need not necessarily be limited to those conditions which produce phenol in excess of the requirements for binary formation as above described. Where the binaries can be used as such or where methods for their separation are available, lower conversions and accordingly lower temperatures can be advantageously employed when using the catalysts disclosed herein.

Although we do not intend to be restricted to any specific temperature range, in general, however, we have found that excellent results can be obtained with our catalysts within the temperature range of 350–600 C.; and where it is desirable to secure very high conversions to phenol the more restricted temperature range of 425–600° is definitely advantageous.

When operating with catalysts which favor dehydration, such as the copper and nickel of Sabatier and Senderens and Skita and Ritter previously referred to, we have found, as a further feature of this invention, that the unfavorable side reactions can be substantially suppressed if there is present in the reaction mixture relatively small amounts of water. For example, we have found that the presence of 0.5–10% (by weight) of water in the feed of raw material has been highly effective in inhibiting side reactions such as dehydration. Accordingly catalysts heretofore disclosed may be employed with some degree of success if upwards to 10% of water is added during the dehydrogenation. Although as a rule water is not required for the type of catalysts utilized in this invention, there may be operating conditions that warrent the use of water with such catalysts.

We have found that reduced partial pressure of reactants may be employed to favor the dehydrogenation reaction. Such reduced pressures may be established by the use of vacuum equipment or by means of a diluent gas such as nitrogen or vaporized benzene. However, at relatively high temperatures operation at atmospheric pressure or even higher is quite satisfactory, particularly at temperatures above 425°.

Although not limiting the invention the following examples will serve to indicate how this invention may be practiced.

*Example I*

A mixture consisting of 940 g. cyclohexanone and 60 g. water was heated to vaporization and passed at a space velocity of 250 over an alkali promoted manganese chromite catalyst in a vessel which was maintained at 525° C. By space velocity is meant the volume of gas (calculated under standard conditions) per volume of catalyst per hour. This quantity of cyclohexanone and water was passed during a period of 3 hours, at the expiration of which time 86% of the ketone was converted to phenol and 12% was unreacted. The resulting product is distilled at a temperature of about 105° and under 50 mm. of pressure to give a distillate containing 722 grams of phenol, 113 grams of cyclohexanone and 20 grams of high-boiling residue. The resultant mixture is separated by further distillation to remove the pure phenol.

*Example II*

In a manner similar to that described in Example I, cyclohexanol containing 6.3% water by weight was vaporized and passed over a Cu-Mn chromite catalyst at total inlet space velocity of 137. Total pressure was one atmosphere and the temperature was 425° C. 77% of the cyclohexanol was converted to phenol, 15% to cyclohexanone, and 8% to by-products (benzene, cyclohexene and tar).

*Example III*

In a manner similar to that of Examples I and II, a mixture of 98 g. cyclohexanone and 78 g. benzene was vaporized and passed over a potassium carbonate promoted copper manganese chromite catalyst at a space velocity of 250 and at 425° C., under one atmosphere total pressure. 62% of the ketone was converted to phenol, 26% was unreacted and 12% went to side reactions. If, after operation of this invention, a resinous deposit or layer appears upon the surface of the catalyst, it may be removed by oxidizing the catalyst with oxygen or air at an elevated temperature of, say, 350 to 500° C., following which it may be reduced before further use if desired.

Various changes may be made in the details of the present invention without departing therefrom or sacrificing any of the advantages thereof.

We claim:

1. The process for the production of phenol which comprises passing a material selected from the group consisting of cyclohexanol and cyclohexanone over a copper-manganese chromite dehydrogenation catalyst at a temperature within the range of 350 to 600° C. and removing phenol from the resultant product.

2. The process for the production of phenol which comprises passing a material selected from the group consisting of cyclohexanol and cyclohexanone over a copper-manganese chromite dehydrogenation catalyst at a temperature within the range of 425 to 550° C. and removing phenol from the resultant product.

3. A process for the production of phenol which comprises passing a substance selected from the group consisting of cyclohexanol and cyclohexanone, over a manganese chromite dehydrogenation catalyst at a temperature within the range of 350 to 600° C. and at a pressure within the range 200 mm. to 10 atmospheres, and removing phenol from the resultant product.

4. A process for the production of phenol which comprises heating a substance selected from the group consisting of cyclohexanol and cyclohexanone at a temperature within the range of from 350 to 600° C., in the presence of a catalytic body selected from the group consisting of manganese chromite and copper-manganese chromite.

5. A process for the production of phenol which comprises heating a substance selected from the group consisting of cyclohexanol and cyclohexanone at a temperature within the range of from 350 to 600° C., in the presence of manganese chromite.

6. A process for the production of phenol which comprises heating a substance selected from the group consisting of cyclohexanol and cyclohexanone at a temperature within the range of from 350 to 600° C., in the presence of copper-manganese chromite.

7. A process for the production of phenol which comprises heating a substance selected from the group consisting of cyclohexanol and cyclohexanone at a temperature within the range of from 350 to 600° C., in the presence of manganese chromite, together with a promoter selected from the group consisting of alkali metals and alkaline earth metals and their salts.

8. A process for the production of phenol which comprises heating a substance selected from the group consisting of cyclohexanol and cyclohexanone at a temperature within the range of from 350 to 600° C., in the presence of copper-manganese chromite, together with a promoter selected from the group consisting of alkali metals and alkaline earth metals and their salts.

9. A process for the production of phenol which comprises heating a substance selected from the group consisting of cyclohexanol and cyclohexanone at a temperature within the range of from 350 to 600° C., in the presence of a catalytic body selected from the group consisting of manganese chromite and copper-manganese chromite, the reaction being carried on in the presence of from 0.5 to 10% of water, based upon the weight of the reactants.

10. A process for the production of phenol which comprises heating a substance selected from the group consisting of cyclohexanol and cyclohexanone at a temperature within the range of from 350 to 600° C., in the presence of a catalytic body selected from the group consisting of manganese chromite and copper-manganese chromite, together with a promoter selected from the group consisting of alkali metals and alkaline earth metals and their salts, the reaction being carried on in the presence of from 0.5 to 10% of water, based upon the weight of the reactant.

11. A process for the production of phenol which comprises heating a substance selected from the group consisting of cyclohexanol and cyclohexanone at a temperature within the range of from 350 to 600° C., in the presence of manganese chromite, the reaction being carried on in the presence of from 0.5 to 10% of water, based upon the weight of the reactant.

12. A process for the production of phenol which comprises heating a substance selected from the group consisting of cyclohexanol and cyclohexanone at a temperature within the range of from 350 to 600° C., in the presence of copper-manganese chromite, the reaction being carried on in the presence of from 0.5 to 10% of water, based upon the weight of the reactant.

13. A process for the production of phenol which comprises heating a substance selected from the group consisting of cyclohexanol and cyclohexanone at a temperature within the range of from 350 to 600° C., in the presence of manganese chromite, together with a promoter selected from the group consisting of alkali metals and alkaline earth metals and their salts, the reaction being carried on in the presence of from 0.5 to 10% of water, based upon the weight of the reactant.

14. A process for the production of phenol which comprises heating a substance selected from the group consisting of cyclohexanol and cyclohexanone at a temperature within the range of from 350 to 600° C., in the presence of copper-manganese chromite, together with a promoter selected from the group consisting of alkali metals and alkaline earth metals and their salts, the reaction being carried on in the presence of from 0.5 to 10% of water, based upon the weight of the reactant.

EDWARD P. BARTLETT.
EDMUND FIELD.